(12) United States Patent
Corren et al.

(10) Patent No.: US 7,877,170 B2
(45) Date of Patent: Jan. 25, 2011

(54) REMANENT VOLTAGE GENERATOR TACHOMETER AND CONTROL FOR INDUCTION MACHINE

(75) Inventors: Dean Corren, Burlington, VT (US); Jamey Gerlaugh, Takoma Park, MD (US); Douglas Lessig, Erie, CO (US); Christopher Gray, Wheaton, IL (US)

(73) Assignee: Verdant Power, Arlington, VA (US)

( * ) Notice: Subject to any disclaimer, the term of this patent is extended or adjusted under 35 U.S.C. 154(b) by 178 days.

(21) Appl. No.: 11/802,614

(22) Filed: May 24, 2007

(65) Prior Publication Data
US 2008/0290735 A1 Nov. 27, 2008

(51) Int. Cl.
*G05D 17/00* (2006.01)
*H01F 27/42* (2006.01)
*H02P 9/10* (2006.01)

(52) U.S. Cl. ..................... 700/298; 307/101
(58) Field of Classification Search ......... 700/286–290, 700/292, 297, 298; 307/101; 318/716–724, 318/807; 322/28, 29, 59–66
See application file for complete search history.

(56) References Cited

U.S. PATENT DOCUMENTS

| | | | | |
|---|---|---|---|---|
| 3,781,616 A | * | 12/1973 | Mokrytzki et al. | 318/801 |
| 3,798,522 A | * | 3/1974 | Pisecker et al. | 318/718 |
| 4,054,898 A | * | 10/1977 | Streit et al. | 257/563 |
| 4,129,893 A | * | 12/1978 | Angello | 361/21 |
| 4,268,787 A | * | 5/1981 | Sloan | 322/8 |
| 4,315,202 A | * | 2/1982 | Dawson et al. | 318/718 |
| 4,383,215 A | * | 5/1983 | Frister | 322/63 |
| 4,461,957 A | * | 7/1984 | Jallen | 290/44 |
| 4,575,671 A | * | 3/1986 | Lee et al. | 322/16 |
| 4,613,279 A | | 9/1986 | Corren et al. | |
| 4,613,763 A | * | 9/1986 | Swansen | 290/44 |
| 4,839,589 A | * | 6/1989 | Heinle | 324/166 |
| 5,075,612 A | * | 12/1991 | Margaris | 318/807 |
| 5,216,567 A | * | 6/1993 | Kontanzer | 361/3 |
| 5,262,680 A | * | 11/1993 | Hu | 307/130 |
| 5,479,086 A | * | 12/1995 | Konstanzer | 323/238 |

(Continued)

FOREIGN PATENT DOCUMENTS

FR 2337886 A * 9/1977

(Continued)

OTHER PUBLICATIONS

Binder, Andreas J.F., DC Machines, Wiley Encyclopedia of Electrical and Electronics Engineering, 1999.*

(Continued)

*Primary Examiner*—M. N. Von Buhr
(74) *Attorney, Agent, or Firm*—Davidson Berquist Jackson & Gowdey, LLP (57) ABSTRACT

In a power generating system the remanent voltage of an induction machine is measured. The frequency of the remanent voltage is compared to a predetermined threshold. When the frequency of the remanent voltage is greater than the predetermined threshold the induction machine is connected to the power grid. Induction machine is disconnected from power grid once generated power drops below a predetermined threshold. Once the induction machine is disconnected, it is prevented from being reconnected to the power grid until a predetermined time period elapses.

12 Claims, 4 Drawing Sheets

U.S. PATENT DOCUMENTS

| | | | |
|---|---|---|---|
| 5,635,811 A * | 6/1997 | Rebhan et al. | 318/778 |
| 5,680,753 A * | 10/1997 | Hollinger et al. | 60/779 |
| 5,714,862 A * | 2/1998 | Mikesell et al. | 318/807 |
| 6,018,225 A * | 1/2000 | Garces | 318/798 |
| 6,037,753 A * | 3/2000 | Uematsu et al. | 322/29 |
| 6,392,378 B1 * | 5/2002 | Kasper et al. | 318/701 |
| 6,459,230 B1 * | 10/2002 | Tao | 318/798 |
| 6,661,207 B2 * | 12/2003 | Nelson et al. | 322/29 |
| 6,707,276 B2 * | 3/2004 | Takahashi et al. | 322/28 |
| 6,921,989 B2 * | 7/2005 | Baranowski et al. | 307/139 |
| 6,933,704 B2 * | 8/2005 | Nelson et al. | 322/29 |
| 7,200,996 B2 * | 4/2007 | Cogswell et al. | 60/651 |
| 7,211,984 B2 * | 5/2007 | Patel et al. | 318/778 |
| 7,224,148 B2 * | 5/2007 | Watanabe et al. | 322/59 |
| 7,224,557 B2 * | 5/2007 | Kinsella et al. | 361/2 |
| 7,342,321 B2 * | 3/2008 | Kitamura | 290/1 R |
| 7,388,367 B2 * | 6/2008 | Stauder et al. | 324/207.25 |
| 7,506,726 B2 * | 3/2009 | Andrejak et al. | 187/290 |
| 2004/0070210 A1 | 4/2004 | Johansen et al. | |
| 2004/0246085 A1 * | 12/2004 | West | 336/96 |
| 2005/0247059 A1 * | 11/2005 | Cogswell et al. | 60/645 |
| 2007/0035136 A1 * | 2/2007 | Janssen | 290/44 |
| 2007/0078567 A1 * | 4/2007 | Riesberg et al. | 700/287 |
| 2007/0132248 A1 * | 6/2007 | Weng et al. | 290/44 |
| 2007/0273336 A1 * | 11/2007 | Davis | 322/22 |
| 2008/0150282 A1 * | 6/2008 | Rebsdorf et al. | 290/44 |
| 2009/0167095 A1 * | 7/2009 | Rivas et al. | 307/87 |

FOREIGN PATENT DOCUMENTS

| | | | |
|---|---|---|---|
| JP | 06276796 A | * | 9/1994 |
| RO | 73437 A | * | 6/1977 |

OTHER PUBLICATIONS

"Crouzet Model KSW2-RS Safety Relay (45mm)", 2 pages.
"General Documentation MRI Voltage Regulators AVR's", pp. 1-23.
"SIPROTEC 4 7UM61 Multifunction Generator and Motor Protection Relay", Siemens SIP -2003, 4 pages.
"Tesch Model M420 Measuring Relay", www.tesch.de, 2 pages.
Fladerer, Thomas, "The Asynchronous Generator in Small Power Plants", pp. 1-12, Mar. 2004.

* cited by examiner

REMANENT VOLTAGE GENERATOR TACHOMETER AND CONTROL FOR INDUCTION MACHINE

RELATED PATENTS AND PUBLICATIONS

Reference is made to U.S. Pat. No. 4,613,279, Corren et al. entitled "Kinetic Hydro Energy Conversion System," which issued on Sep. 23, 1986, and to United States Published Patent Application No. 2004/0070210, Johansen et al., entitled "Apparatus For Production Of Energy From Currents In Bodies Of Water, a Foundation and A Method For The Installation Of The Apparatus," published on Apr. 15, 2004, each of which are incorporated herein by reference.

The present application is related to co-pending U.S. patent applications (1) U.S. Application No 11/727,112, filed on Mar. 23, 2007, entitled "Cable Jacket Sealing, Pressurization, and Monitoring" (Pub. No. US-2008-0271803) (2) U.S. application No. 11/634,847, filed Dec. 7, 2006, entitled "Non-Fouling Kinetic Hydro Power System Axial-Flow Blade Tip Treatment", now U.S. Pat. No. 7,789,629, (3) U.S. Application No. 11/889,251, filed Aug. 10, 2007, entitled "Kinetic Hydro Power Triangular Blade Hub", (Pub. No. US-2009-0041584) and (4) U.S. patent application Ser. No. 11/400,281, filed on Apr. 10, 2006, entitled "Kinetic Hydropower From Slow Moving Waters", now U.S. Pat. No. 7,456,514.

COPYRIGHT NOTICE

A portion of the disclosure of this patent document contains material which is subject to copyright or mask work protection. The copyright or mask work owner has no objection to the facsimile reproduction by anyone of the patent document or the patent disclosure, as it appears in the Patent and Trademark Office patent file or records, but otherwise reserves all copyright or mask work rights whatsoever.

FIELD

This relates to sensing the rotation rate of a turbine by using the small remanent voltage (RV) generated by the induction machine due to its residual internal magnetism that persists even when the machine is not connected to a power grid to control the operation of the induction generator.

INTRODUCTION

Induction machines (motor/generator) utilize the properties of electromagnetism to perform a mechanical/electrical energy conversion. Induction machines used for electrical power applications, such as turbines, convert rotational motion into electrical power and provide the electrical power to a power grid. A grid-connected induction machine that is mechanically driven to rotate faster than its grid-synchronous speed performs as a generator. A grid-connected induction machine that is rotating slower than its grid-synchronous speed performs as a motor. Some turbines (such as wind turbines and kinetic hydropower turbines) rely on a natural fluid flow as their source of mechanical energy. In a variable flow environment, such as when the source of the flow is from a water or wind current, there are times when the available resource is too weak to turn the turbine, or too weak to turn the turbine fast enough to generate useful power, and motoring (absorbing power) is generally undesirable as wasteful of power and machinery life. Particularly with tidal kinetic hydropower, wherein the speed of the water varies periodically, we want to sense when the speed of the machine is appropriate for connection of the turbine's induction machine to the grid.

When the water speed is increasing towards the ability to generate power, but yet unable to generate power, connecting the induction machine to the grid too early, causes the machine to motor. It may also cause a trip offline (disconnection from the grid) due to the action of other protective relaying. Connecting too late can result in potential power generation being unnecessarily forgone and can cause excessive turbine wear.

One way prior art systems have attempted to determine when to connect a turbine to the grid is to include tachometry instrumentation at the turbine to measure the speed of the turbine and generator directly. However, including tachometry instrumentation at the turbine, particularly in a hostile environment, such as underwater, to directly measure the speed of the turbine incurs costs for equipment including data communication and maintenance, and imposes reliability problems for the instrumentation and entire system.

Even the use of timers in underwater systems to determine when to connect the turbine to the grid would be disadvantageous. In tidal waters, the velocity of water flow periodically varies in accordance with the tides, so one can envision a timer being set to connect the turbine in accordance with the tide predictions. But, timers are disadvantageous because they cannot compensate for variations in otherwise predictable periodic behavior. Further, timers are impractical in environments where the behavior of the fluid flow does not follow a predictable pattern e.g. downstream of a dam with irregular releases.

To make natural energy power systems more cost effective there is a need to use efficient, but extremely rugged and simple generators such as induction machines for distributed generation, especially in hostile environments such as underwater. Ideally, the components of such systems can be simple, rugged, and low-cost, including the rotating equipment and the electrical and electronic control systems. Thus, there is a need for a rugged low cost device that can increase turbine efficiency by determining the optimum times at which the turbine should be connected to the power grid and disconnected from the power grid.

The present disclosure relates to sensing the turbine rotation rate using the small remanent voltage (RV) generated by the turbine due to its residual internal magnetism that persists even when the turbine is not connected to the power grid. Unaugmented, this voltage cannot be used to generate useful power, but its presence and frequency can be used to detect the speed at which the induction machine is turning when it is not connected to the grid, and use that information to control the switching of the turbine to the power grid.

Prior art devices have used remanent voltage to determine whether an inductance machine is turning or stopped. Examples of such systems are the Tesch Model M420 Motor Standstill Monitor and the Crouzet Model KSW2-RS Safety Relay. Reference is made to the disclosed documents describing such systems. The safety relay described above uses remanent voltage to prevent physical access to a motor until the motor is stopped i.e. protective guards cannot be opened until the remanent voltage measurement indicates that the motor is stopped. Another known use of remanent voltage is using remanent voltage to power voltage regulators connected to a generator. Submitted documentation on EMRI Automatic Voltage Regulators describes such voltage regulators. However, the devices described above have not used a remanent voltage indication of rotation rate to determine the optimal time to connect a generator to a power grid.

Measuring remanent voltage allows the speed of the generator to be sensed without a separate tachometer sensor and circuitry, even when it is disconnected from the electric grid, so the proper time for connecting the generator can be determined and controlled. Measuring remanent voltage also provides limited, but continuous information on the condition of the induction generator even when the generator is not connected to the power grid. Further, for underwater applications, measuring remanent voltage allows the turbine or turbines to be controlled without direct measurement of the water speed which is expensive, error-prone and costly to maintain and monitor.

Remanent voltage measurements can also be combined with direct fluid measurements to allow the monitoring of a turbine condition based on its rotation rate at different flow velocities. For example, in an underwater application, the rotational rate of a turbine can be measured at a given water speed to determine the relationship between water speed and rotational rate. In the instance where it is determined that the relationship between water speed and rotational rate is different than a predicted relationship, it may be determined that the turbine requires maintenance.

BRIEF DESCRIPTION OF THE DRAWINGS

The following description, given with respect to the attached drawings, may be better understood with reference to the non-limiting examples set forth with the drawings which are as follows.

DETAILED DESCRIPTION OF THE PRESENTLY PREFERRED EXEMPLARY EMBODIMENTS

Figure 1A:
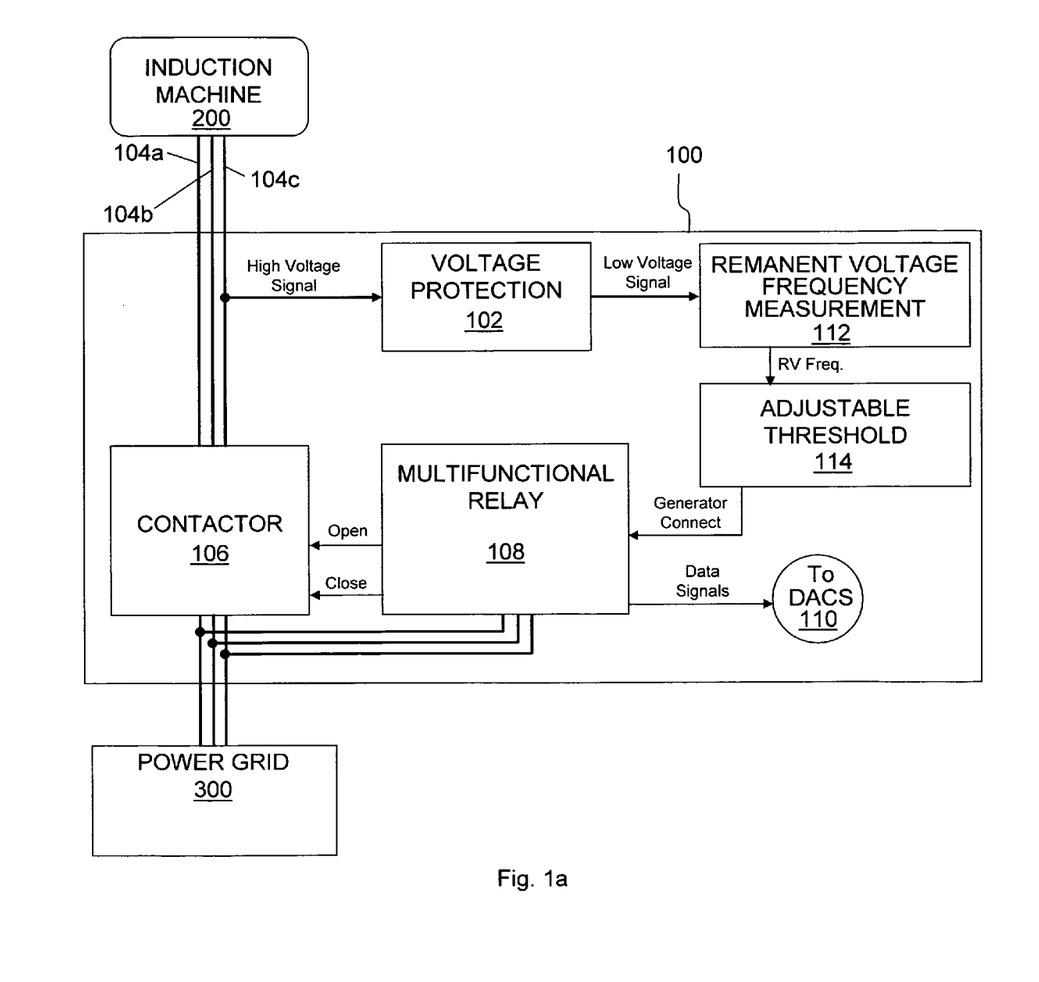
FIG. 1a is a block diagram of an exemplary power generating system with a remanent voltage measurement and control system.

FIG. 1a is a block diagram showing an exemplary power generating system incorporating switching system 100 which measures the remanent voltage of induction machine 200 to determine when to connect induction machine 200 to power grid 300. Induction machine 200 produces electrical energy from mechanical energy. Induction machine (generator/turbine) 200 is typically a Kinetic Hydro Power (KHP) turbine that is located underwater, but can be any type of generator suitable for operation in a variety of environments, e.g. a wind turbine. Induction machine 200 transmits electrical power by using a three-phase mode, where wires 104a, 104b, and 104c each transmit one of the three phases. It should be noted that a neutral wire can also be included and that other electrical power transmission methods can be used (e.g. single phase or other polyphase methods). Wires 104a, 104b, and 104c are insulated conductors capable of safely carrying an electrical current with a magnitude as required by the power generating system. Power grid 300 contains built-in protection circuitry (not shown) that disconnects the generator in the case of various fault conditions.

As shown, wires 104a, 104b, and 104c are connected to switching system 100. Switching system 100 includes voltage protection circuitry 102, contactor 106, multifunctional relay 108, remanent voltage frequency measurement circuitry 112, and adjustable threshold circuitry 114.

The wires can enter switching system 100 via a conduit that encloses and protects the wires such as PVC or metal piping or the like.

Contactor 106 provides the mechanism that physically and electrically connects the contacts of the induction machine 200 to the power grid 300. Contactor 106 connects or disconnects induction machine 200 to or from power grid 300 based on commands received from multifunctional relay 108. Contactor 106 is a standard contactor capable of handling the voltage and current required by the power generating system.

Once wires 104a, 104b, and 104c from the induction generator enter switching system 100, one or more of the wires is connected to voltage protection circuitry 102 where the high voltage signal on the wire can be stepped down to a lower voltage signal, typically a 4:1 step down. The voltage is typically stepped down because of the safety considerations when connecting to the wires 104a, 104b, and 104c which typically have 480 VAC on them when connected to power grid 300. This allows the circuit to passively remain connected whether the generator is de-energized or energized. High voltage protection circuitry 102 can include any combination of voltage divider, transformer, Hall Effect voltage sensor, and other voltage reduction/isolation circuitry.

Figure 1B:
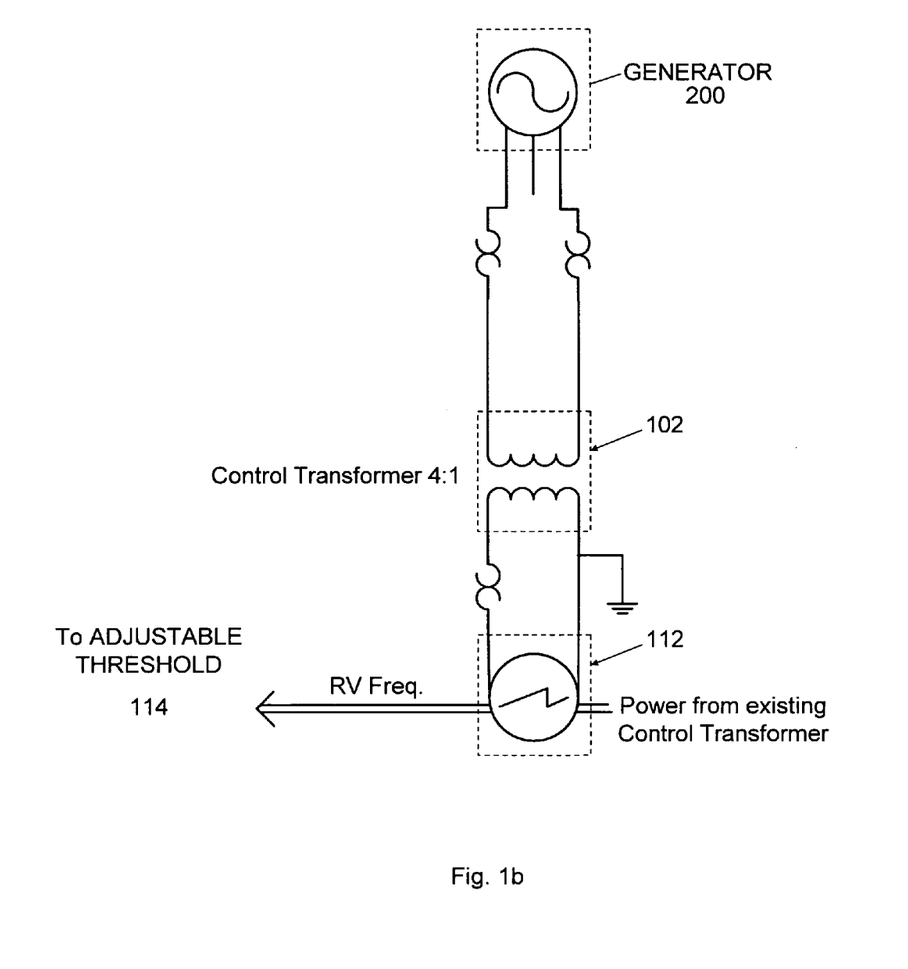
FIG. 1b is an exemplary embodiment of the power generating system of FIG. 1a with a detailed view of exemplary voltage protection circuitry.

FIG. 1b shows an exemplary embodiment of the system described in accordance with FIG. 1a where voltage protection circuitry 102 is simply a 4:1 transformer. It should be noted, that in some instances it may not be necessary to lower the voltage, but only necessary to provide isolation and in other instances a greater step down may be necessary, as such, the exemplary 4:1 step down is not intended to be limiting. It should also be noted that although it is only necessary to measure the remanent voltage for one phase of a three phase system and thus only necessary to connect one wire to voltage protection circuitry 102, as described above, in some instances it may be desirable to measure the remanent voltage from more than one of the phases, or wires 104a, 104b, and 104c.

The low voltage signal output from voltage protection circuitry 102 is received by remanent voltage frequency measurement circuitry 112. Remanent voltage frequency measurement circuitry 112 must be able to measure small voltages, typically less than 1 VAC, while accommodating the higher voltage present at the output of voltage protection circuitry 102 when generator 200 is connected to the power grid 300 during actual generation. Remanent voltage frequency measurement circuitry 112 is typically a standard frequency counter capable of operating within the required voltage range that can output a signal representing the frequency of the remanent voltage, and/or a signal based on the frequency reaching a certain setpoint. The frequency measured by this circuitry is proportional to the speed of the generator and therefore can be used as a tachometer.

For a particular 37 kW (50 HP) induction motor/generator, even after not being operated for over one month, there was adequate residual magnetism and remanent voltage to measure over the generator power lines when not connected to the grid power lines. One such measurement was about 14 VAC at 48 Hz.

Adjustable Threshold Circuitry 114 receives the signal representing the frequency of remanent voltage and compares the frequency to a user defined threshold. When the frequency exceeds the threshold, the Adjustable Threshold Circuitry 114 sends a "Generator Connect" signal to multifunctional relay 108. Adjustable threshold circuitry typically incorporates a relay which sends the "Generator Connect" signal once it is triggered. Since 60 Hz corresponds to the grid-synchronous frequency, the threshold frequency for sending a "Generator Connect" signal to contactor 106 would be set at an appropriate value above 60 Hz, e.g. 66 Hz. The threshold can be adjusted throughout the lifetime of Adjustable Threshold Circuitry 114. It should be noted that although Adjustable Threshold Circuitry 114 and Remanent Voltage Frequency Measurement Circuitry 112 are shown as separate functional blocks, this is for descriptive purposes only and not intended to limit how Adjustable Threshold Circuitry 114 and Remanent Voltage Frequency Measurement Circuitry 112 are physically embodied. For example, the functions of Adjustable Threshold Circuitry 114 and Remanent Voltage Frequency Circuitry 112 can be incorporated into a single frequency meter unit. Likewise, the functional blocks described in accordance with FIG. 1a can also be combined into any combination of physical units as would be appreciated by one of ordinary skill in the art.

Frequency of the remanent voltage is related to the speed of the turbine as a function of the gearbox ratio. For example, for a turbine of the present embodiment, a disconnected generator remanent voltage tachometry signal of 60 Hz corresponds to a rotor speed of approximately 34.5 rpm and a generator speed of approximately 1800 rpm.

When multifunctional relay 108 receives a "Generator Connect" signal from the Adjustable Threshold Circuitry 114, multifunctional relay 108 closes the contactor 106 which connects generator 200 to power grid 300, but only if all protective functions and other logical control parameters are satisfied. The multifunctional relay 108 also serves to protect generator 200 and the power generating system by monitoring if a hazardous condition occurs e.g. an earth fault, short-circuits, overload, over and under voltage, etc. In the event that a hazardous condition occurs, multifunctional relay 108 opens the contactor 106 which disconnects generator 200 from power grid 300 preventing damage to the power generating system. Multifunctional relay 108 is also used to open contactor 106 when it is determined that generator 200 is no longer producing useful power. Multifunctional relay 108 is able to determine when to open contactor 106 by monitoring the lines connected from the contactor to the power grid. Multifunction relay 108 measures the voltage, current, and frequency on the power lines. From these measurements the power being generated and the occurrence of a fault condition can be determined.

Multifunctional relay 108 is also in communication with a remote data acquisition system (DACS) 110. This connection allows generator 200 to be monitored and controlled from a remote location. An example of such a multifunctional protection relay is the SIPROTEC 4 7UM61 manufactured by Siemens.

Figure 2:
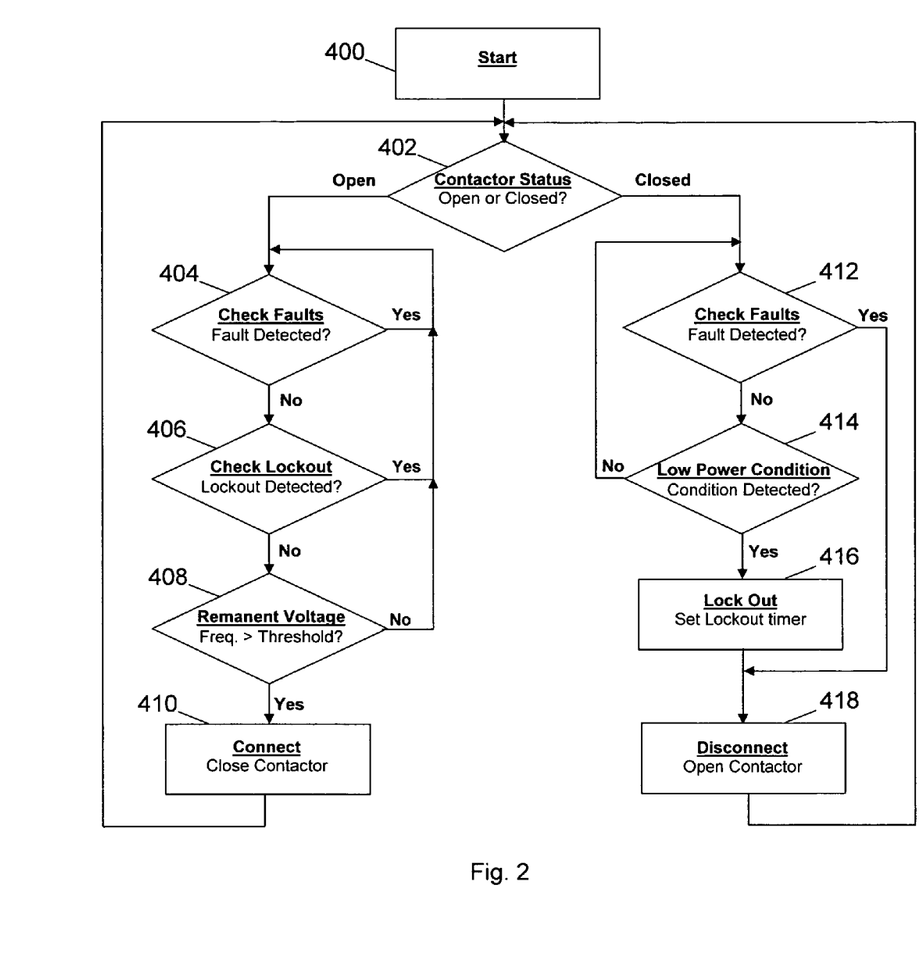
FIG. 2 is a flow chart illustrating exemplary operation of power generating system with a remanent voltage measurement and control system.

FIG. 2 is a simplified flow chart illustrating the basic operation of switch 100. The operation of switch 100 is described by specifying two distinct operating states that correspond to the open and closed states of contactor 106. The process starts at step 400 when power generating system is initialized for normal use. Decision block 402, is used to distinguish the operating states of the switch 100.

When contactor 106 is open, i.e. generator 200 is not connected to power grid 300, the operation of the switch follows a connection process where a series of conditions, steps 404, 406, and 408, are used to determine whether contactor 106 should be closed. At step 404, it is determined whether any fault conditions are present. If a fault condition is present, step 404 is repeated until the fault condition is no longer present, as such, the power generating system is protected by not allowing generator 200 to be connected to the power grid 300 unless no faults exist.

A determination is made as to whether a lockout condition is present at step 406. The lockout condition occurs when contactor 106 is opened at the end of a normal power generating cycle. The lockout condition prevents the generator 200 from being prematurely connected to power grid 300. The lockout condition is discussed in more detail in accordance with FIG. 3. If a lockout condition is detected, the connection process is restarted at step 404. This way, generator 200 cannot be connected to grid 300 when a lockout condition is present.

A determination is made as to whether the frequency of the remanent voltage is greater than the predetermined threshold defined by Adjustable Threshold Circuitry 114. If the frequency is not greater than the predetermined threshold, the connection process is restarted at step 404. If the frequency is greater than the predetermined threshold, then the connection process is complete and the contactor 106 is closed at step 410.

It should be noted that although the conditions of the connection process are described as steps in a particular order, such a description is not intended to be limiting. Typically, all three conditions are constantly being monitored simultaneously in which case the order in which the conditions are checked is not applicable. However, the conditions can be checked in a set order, thereby creating a sequential control process where the order of the steps can be any of the possible combinations thereby creating a hierarchy of conditions.

When contactor 106 is closed, fault conditions are constantly monitored at step 412 and the power generated by generator 200 is constantly being monitored at step 414. Under normal operating conditions, as long as a fault does not occur and the low power condition does not occur contactor 106 remains closed and generator 200 remains connected to power grid 300. When a fault condition occurs, contactor 106 is opened and generator is disconnected from power grid 300 at step 418 and switch 100 operates under open operating conditions at step 404.

When generator 200 is connected to power grid 300, if the power being generated goes below a predetermined threshold, i.e. a low power trip, then a lockout timer is set at step 416 and contactor 106 is open at step 418. It should noted that there can be other ways of determining a low power trip at step 414 aside from measuring the power directly. For example, rotor/generator speed can be measured, fluid speed can be measured, elapsed time of the present connection can be measured, a reverse power condition can be monitored. Further, there are other ways of disconnecting generator 200 from power grid 300, which for the sake of simplicity are not incorporated into FIG. 2 e.g. user overrides and protections built into grid 300.

Figure 3:
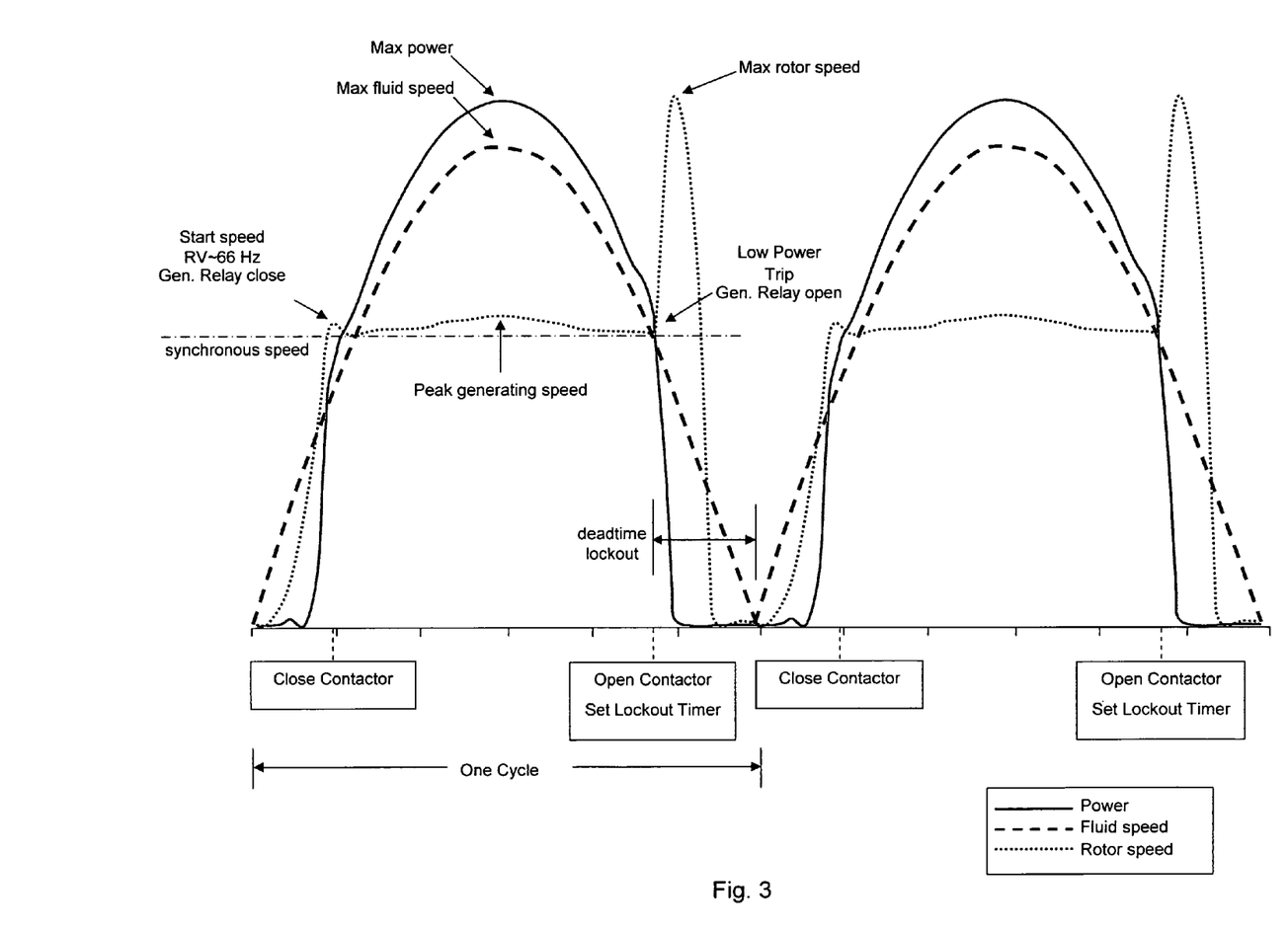
FIG. 3 is graph depicting generator behavior.

FIG. 3 is a graph illustrating typically generator 200 behavior where no faults occur and the source fluid has periodic behavior. The horizontal axis represents time and the vertical axis represents the magnitude of the following quantities: power, fluid speed, and rotor speed. As shown, fluid speed is modeled by a curve similar to a fully-rectified sine wave. An example of such a system that would follow this model is a bi-directional underwater turbine placed in a body of water with a tidal flow. Initially, generator 200 is disconnected from power grid 300 and the lockout timer is not set. The increase in fluid speed causes rotor speed to increase. When it is determined that rotor speed is sufficiently above the synchronous speed, as determined by measuring the frequency of remanent voltage, and if all protective function and control parameters are met, generator 200 is connected to power grid 300.

Once generator 200 is connected to power grid 300, power grid 300 acts as a load which stabilizes the rotor speed by locking the rotor speed to near the synchronous speed concomitant with the frequency of the power grid. While generator 200 is connected to the power grid 300, fluid speed continues to increase. Energy of the fluid beyond what is necessary for the rotor to maintain its speed under the load is absorbed by power grid 300 thereby increasing the amount of power generated, until a point of maximum power. As the fluid speed begins to decrease, power generation decreases until eventually the power generated decreases to a point where the generator 200 can no longer produce useful power. When this Low Power set point occurs, generator 200 is disconnected from the power grid 300. Disconnecting the generator 200 from power grid 300 causes rotor speed to increase, since the load is removed from generator 200.

When generator 200 is disconnected a dead time lockout occurs, that is, a timer is started which prevents generator 200 from reconnecting to power grid 300 until sufficient time has elapsed. This way, the spike in rotor speed from a disconnection is not mistaken as the rotor building up speed at the beginning of the cycle. The dead time is set such that it is long enough for the rotor speed to decrease below the threshold while being short enough not to overlap with the next cycle. As shown, in the absence of a fault condition, the process for connecting generator 200 to power grid 300 repeats as determined by the behavior of fluid flow.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A method for controlling the points at which an induction machine is configured to be connected to a power grid comprising the steps of:
   measuring the frequency of remanent voltage generated at the start up of the induction machine corresponding to rotation speed thereof and comparing the measured frequency with a preset rotation speed threshold; and
   connecting the induction machine to the power grid when said frequency of the remanent voltage is greater than the preset rotation speed threshold equal at least to a value corresponding to a desired grid-synchronous speed;
   monitoring the power being generated by said induction machine and disconnecting said induction machine from the power grid if a disconnection condition occurs;
   instituting a dead time lockout condition following a disconnection to prevent rotor speed spikes occurring upon disconnection to result in a false rotation speed condition to be sensed as being above the preset rotation speed threshold;
   allowing the rotation speed to decrease below the preset rotation speed threshold and following the dead time lockout reconnecting the induction machine to said power grid when the frequency of the remanent voltage again exceeds the preset rotation speed threshold.

2. The method of claim 1, wherein said disconnection condition occurs when power being generated by said induction machine drops below a predetermined power threshold.

3. The method of claim 1, wherein said preset rotation speed threshold is adjustable.

4. A water source driven power generating system comprising:
   an induction machine driven by flowing water that generates a remanent voltage;
   a power grid;
   a switching device adapted to control the connection of the induction machine to said power grid wherein switching device comprises:
   measurement circuitry adapted to measure the frequency of said remanent voltage at the start of the induction machine being driven by the water source;
   threshold circuitry adapted to determine if the frequency of said remanent voltage exceeds a predetermine rotation speed threshold; and
   control circuitry adapted to connect the induction machine to the power grid when the frequency of the remanent voltage exceeds the predetermined rotation speed threshold equal at least to a value corresponding to a desired grid-synchronous rotational speed;
   wherein said control circuitry is adapted to disconnect the induction machine from the power grid when a disconnection condition on occurs and the control circuitry is adapted to institute a dead time lockout condition following a disconnection to prevent rotation speed spikes from creating false speed indication and to allow the rotation speed to decrease below the predetermined rotation speed threshold and to permit reconnecting of the induction machine to the power grid when the frequency of the remanent voltage again exceeds the predetermined rotation speed threshold.

5. The water source driven power generating system of claim 4, wherein said disconnection condition occurs when power being generated by said induction machine drops below a predetermined power threshold.

6. The water source driven power generating system of claim 4, wherein threshold circuitry allows the predetermined threshold to be adjusted.

7. The power generating system as in claim 4; wherein the control circuitry also prevents reconnection until the monitored remanent voltage frequency is at least equal to a value corresponding to the grid-syncbronous frequency of the power grid.

8. A water driven power generation system control comprising:
   a water driven turbine that generates power as well as an amount of remanent voltage;
   a power grid for accepting power from the water driven turbine
   a switch system that monitors the cycle of operation of the water driven turbine between start-up, running and low power conditions and in response monitored conditions controlling the connection and disconnection of the water driven turbine relative to the power grid;
   the switch system including monitoring circuitry that monitors the rotational speed of the water driven turbine by monitoring the frequency of the remanent voltage being generated thereby during start-up conditions, and which also monitors the power generated thereby;
   so that when the monitored frequency of the start-up remanent voltage is at least equal to a preset remanent voltage frequency value corresponding to a desired grid-synchronous speed the switching system is activated to connect the water driven turbine onto the power grid;

as the power being generated by the water driven turbine drops to a preset low power trip value the switch system will disconnect the water driven turbine from the power grid; and the switch system further including circuitry for instituting a dead time lockout condition following a disconnection of the water driven turbine from the power grid to prevent rotation speed spikes occurring upon disconnecting to result in a false rotation condition to be sensed as being above the desired grid synchronous speed and to allow the rotation speed of the water driven turbine to decrease below the desire grid synchronous speed and to only reconnect the water driven turbine to the grid after the frequency of the remanent voltage exceeds the preset remanent voltage frequency value.

9. A water driven power generation system control comprising:

a water driven turbine that generates power as well as an amount of remanent voltage;

a power grid for accepting power from the water driven turbine, a switch system that monitors the cycle of operation of the water driven turbine between start-up, running and low power conditions and in response to monitored conditions controls the connection and disconnection of the water driven turbine relative to the power grid;

the switch system including monitoring and control circuitry that determines the rotational speed of the water driven turbine by monitoring the frequency of remanent voltage being generated thereby during start-up and during other periods of operation and determines the power being produced by the power generation system during periods of operation, the monitoring and control circuitry comprising:

a voltage protection circuit connected to output lines from a generator in the water driven turbine to provide a stepped down lower voltage signal to a remanent voltage frequency measuring circuit that senses remanent voltages from the generator and in response to sensed remanent voltages outputs a signal representing the frequency of remanent voltage that is proportional to the rotational speed of the generator to an adjustable threshold circuit, a connector device provided between the generator output and the power grid and controlled by a multi function relay system that is connected between the adjustable threshold circuit and the connector device, said multi function relay system also being connected to and monitoring the voltage, current and frequency on power lines provided between the connector device and the power grid, wherein in response to receiving the signal representing frequency of the remanent voltage said adjustable, threshold circuit compares the frequency; of the remanent voltage with a defined preset rotation speed threshold and when such preset rotation speed threshold is exceeded outputs a connect signal to the multi function relay system that in turn causes the connector device to close the connection between the generator and the power grid;

wherein the multi function relay system will disconnect the generator from the power grid upon sensing that the power being generated drops below a predetermined power threshold; and wherein upon a disconnect the multi function relay system the monitoring and control circuit institutes a lockout condition to prevent rotation speed spikes occurring upon a disconnection from resulting in a false rotation speed to be sensed as being above the preset rotation speed threshold to allow the water driven turbine rotation speed to decrease below a power grid synchronous speed; and wherein the monitoring and control circuit continues to monitor the frequency of the remanent voltage and when such preset rotation speed threshold is again exceeded following a termination of the lockout condition the adjustable threshold circuit will again output a connect signal multi function relay system that in turn causes the connector device to close the connection between the generator, and the power grid.

10. The water driven power generation system control as in claim 9 wherein the multi function relay system will disconnect the generator from the power grid upon the sensing of a fault condition.

11. The water driven power generation system control as in claim 9 wherein the multi function relay system is also connected to a remote data, acquisition system permitting monitoring and control functions to be accomplished from a remote location.

12. The water driven power generation system control as in claim 9 wherein the multi function relay system further monitors the power lines for hazardous conditions so that upon receiving the connect signal the multi function relay system will close the connection between the generator and the power grid provided no hazardous condition has been sensed and upon the sensing Of a hazardous condition during operation the multi function relay system will open the connection between the generator and the power grid.

\* \* \* \* \*